(12) United States Patent
Rosenblum (10) Patent No.: US 10,996,499 B2
(45) Date of Patent: May 4, 2021

(54) VARIABLY REFLECTIVE DISPLAY SYSTEMS AND METHODS

(71) Applicant: Keith Rosenblum, Minneapolis, MN (US)

(72) Inventor: Drew Rosenblum, Minneapolis, MN (US)

(73) Assignee: KEITH ROSENBLUM, Minneapolis, MN (US)

( * ) Notice: Subject to any disclaimer, the term of this patent is extended or adjusted under 35 U.S.C. 154(b) by 0 days.

(21) Appl. No.: 16/536,804

(22) Filed: Aug. 9, 2019

(65) Prior Publication Data

US 2021/0041758 A1    Feb. 11, 2021

(51) Int. Cl.
*G02F 1/1333* (2006.01)

(52) U.S. Cl.
CPC ............................... *G02F 1/13338* (2013.01)

(58) Field of Classification Search
CPC .................................................. G02F 1/13338
See application file for complete search history.

(56) References Cited

U.S. PATENT DOCUMENTS

| 6,560,027 | B2 | 5/2003 | Meine | |
|---|---|---|---|---|
| 2007/0138941 | A1* | 6/2007 | Jin | H01L 27/3232 313/503 |
| 2014/0045547 | A1* | 2/2014 | Singamsetty | G06F 1/163 455/552.1 |
| 2016/0132046 | A1* | 5/2016 | Beoughter | G05B 19/4184 700/17 |
| 2016/0267770 | A1* | 9/2016 | Keays | G08B 25/08 |
| 2017/0351126 | A1* | 12/2017 | Chu | G02F 1/13338 |
| 2019/0146128 | A1* | 5/2019 | Cao | G06F 3/011 359/838 |
| 2020/0124917 | A1* | 4/2020 | Igarashi | G02F 1/1333 |

* cited by examiner

*Primary Examiner* — Jia X Pan
(74) *Attorney, Agent, or Firm* — Schwegman Lundberg & Woessner, P.A.

(57) ABSTRACT

An information display system can include a dynamic panel, including a first surface that faces a user and a second surface generally parallel to the first surface, configured to present a variably reflective surface to the user. The information display system can include a display panel, including a third surface that faces the second surface and a fourth surface generally parallel to the third surface, configured to display information to a user. The information display system can include an activation sensor, configured to enable the system upon interaction with the user.

20 Claims, 3 Drawing Sheets

VARIABLY REFLECTIVE DISPLAY SYSTEMS AND METHODS

BACKGROUND

Multi-tasking, such as the apparent human ability to engage in more than one task at a time, has become a way of life for many individuals. In some cases, technological devices can assist those individuals, such as by providing a device for reviewing and responding to information while otherwise engaged in everyday or mundane tasks.

Meine U.S. Pat. No. 6,560,027 mentions a mirror that provides both an image and information to a user with a touch screen to receive user input.

Cao U.S. Patent Application No. 2019/0146128 mentions a smart mirror that includes an eye tracking mechanism to receive user input.

A "smart" mirror can be described as the combination of a two-way mirror (e.g., a mirror with a reflective front surface and a transparent rear surface) and an integrated display device, such as the display device can be located facing the rear surface of the two-way mirror. The two-way mirror can be semi-reflective, such as only about 50% reflective as compared to a traditional silver glass mirror, to allow transmission of light through the two-way mirror. In an approach, when the display device is "off", the smart mirror can present the illusion of a glass mirror and when the display device is "on", the display device can be visualized through the two-way mirror. However, ambient lighting, such as sunlight from a window or incandescent lighting, can impede the operation of the smart mirror, such as to cause the display device to be visible through the two-way mirror when the display device is "off". This characteristic can interfere with the nominal reflective capability of the smart mirror while degrading aesthetic design intent.

The smart mirror can be coupled to an electronic device, such as at least one of a mobile device, such as an electronic device that can be easily moved by a user including a smart device (e.g., mobile phone, tablet device, etc) or a stationary device, such as a desktop computer or a cable modem. In some cases, the smart mirror can be permanently coupled to an electronic device, such as to a desktop computer, so that user credentials are not required to access and review information from the computer. However, the convenience of "no credential" access afforded to authorized (or verified) smart mirror users can be inadvertently compromised by unauthorized (or unverified) smart mirror users, such as smart mirror users who do not have permission to access to the electronic device permanently coupled to the smart mirror.

The present inventors have recognized, among other things, that a first problem to be solved can include improving the reflective capability of the smart mirror such as when the display device is "off". In some cases varying the reflectivity of the smart mirror can improve the function of the smart mirror in different lighting environments or to suit user preference, such as to optimize visibility of the display component of the smart mirror. A second problem to be solved can include activation of the smart mirror, such as activation of the smart mirror with minimal interaction from a user. A third problem to be solved can include restricting access to the smart mirror, such as to allow only authorized (or verified) users access to the smart mirror to protect against potential disclosure of confidential information.

An overview of certain non-limiting aspects of the present subject matter is provided below.

An information display system, such as a smart mirror, can include a dynamic panel, including a first surface configured to face a user and a second surface generally parallel to the first surface, configured to present a variably reflective surface to the user. The information display system can include a display panel, including a third surface that faces the second surface and a fourth surface generally parallel to the third surface configured to display information to a user. The information display system can include an activation sensor, configured to enable the system upon interaction with the user.

This Summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
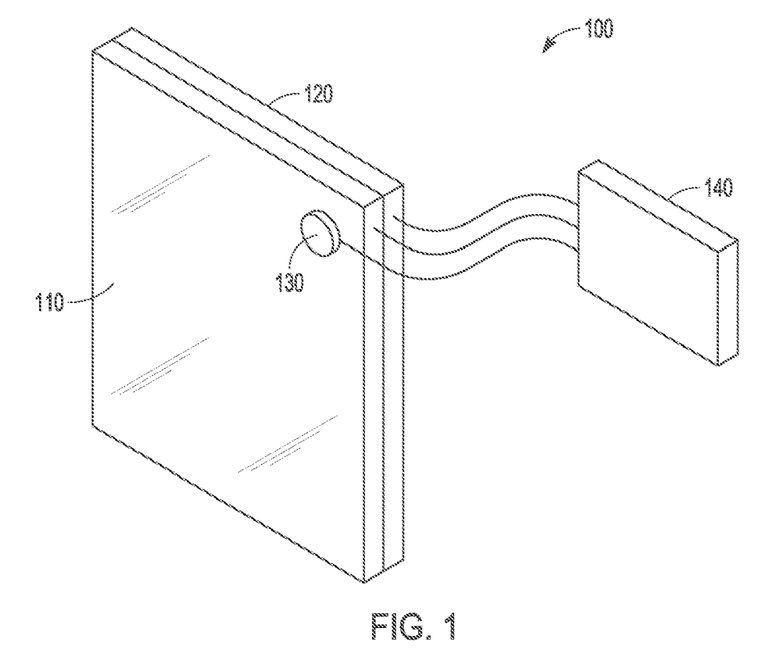
FIG. 1 shows a perspective view of an example display system.

FIG. 1 shows a perspective view of an example display system, such as a variably reflective display system (VRDS) 100. The VRDS 100 can include a dynamic panel 110, a display panel 120, a sensor 130, and system circuitry 140.

Figure 2:
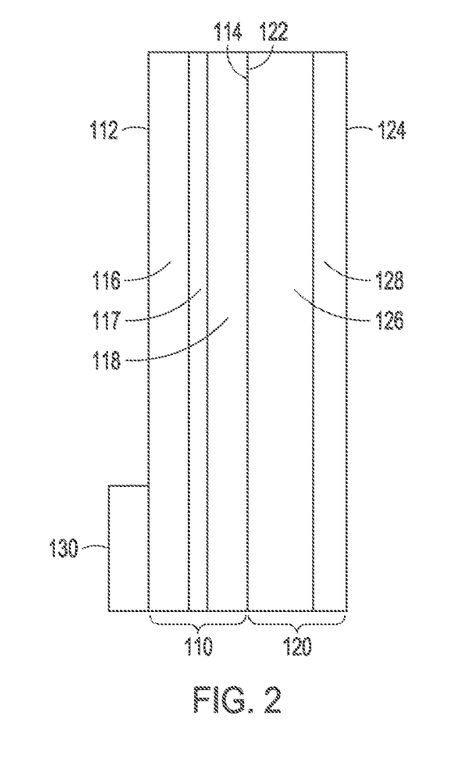
FIG. 2 shows a cross section of the example display system.

FIG. 2 shows a cross section of the example display system. The dynamic panel 110 can be configured to control the reflectivity of the VRDS 100. The dynamic panel 110 can include a first surface 112, such as a first surface 112 that can face a user of the VRDS 100, and a second surface 114, such as a second surface 114 that can be generally parallel to the first surface 112.

The dynamic panel 110 can present a reflecting surface to a user, such as incident light falling upon a user-facing surface can be reflected to the user. The reflectivity of the dynamic panel 110, or the ability of the dynamic panel 110 to reflect incident light to a user, can be adjusted, such as the amount of incident light allowed to pass through the dynamic panel 110 can be changed to suit one or more use conditions. In an example, the reflectivity of the dynamic panel 110 can be adjusted, such as to affect the visibility of the display panel 120 through the dynamic panel 110.

The dynamic panel 110 can control the visibility of information presented to a user, such the dynamic panel 110 can control user visibility of the display panel 120 by altering the reflectivity of the dynamic panel 110. The reflectivity of the dynamic panel 110 can be altered by adjusting a physical property of the dynamic panel 110, such as an adjustable material used in the construction of the dynamic panel 110.

A material with an adjustable physical property, such as an adjustable material, can include a material with adjustable light transmission properties, such as "smart glass" or "switchable glass". A smart glass material can include a glass material or glazing material that can adjust the ability of light to be transmitted through the material, such as light transmissibility through the material can be changed via applied heat, applied light, or applied electrical voltage. Smart glass can include a chromic material, such as at least one of an electrochromic, photochromic, thermochromic, suspended-particle, micro-blind, or polymer-dispersed liquid crystal (PDLC) material. Smart glass can include other materials configured to adjust light transmissibility, such as materials using ferro-electric mechanical polarization, light sensitive glazing, and single target direct current (D.C.) magnetron sputtering with a magnesium-nickel (Mg—Ni) compound.

The dynamic panel 110 can be constructed from one or more layers of material. In an example with reference to FIG. 2, the dynamic panel 110 can include a first support layer 116, an adjustable layer 117, such as an electrically adjustable layer, and a second support layer 118. The support layer, such as the first or second support layers 116, 118, can include a transparent or a semi-transparent material, such as glass or acrylic (e.g., poly(methyl methacrylate) or plexiglass). The adjustable layer 117 can include an adjustable material, such as smart glass material described previously in this application.

The dynamic panel 110 can be configured to present a reflective surface, such as a variably reflective surface, to a user. The degree or amount of surface reflectivity can be defined by an operational mode of the dynamic panel 110. An operational mode can include at least one of a reflective state, a translucent state, or a transparent state.

The dynamic panel 110 can operate in a reflective state, such as the dynamic panel 110 can present a reflective surface to a user. The reflective surface can reflect incident light, such as about 90% in about 100% of incident light can be reflected from the dynamic panel 110 to the user. In an example, the VRDS 100 in the reflective state can serve as a mirror, such as a mirrored surface which can be used for personal hygiene.

The dynamic panel 110 can include a transparent state, such as the dynamic panel 110 can present a transparent surface to the user, such as a transparent surface to allow the user to look through the dynamic panel 110 to see the display panel 120. The transparent surface can be non-reflective to incident light, such as about 0% to about 10% of incident light can be reflected from the dynamic panel 110 to the user. In an example, the VRDS 100 in transparent state can serve as a protective screen, such as a protective screen that can prevent damage to the display panel 120.

The dynamic panel 110 can include a translucent state, such as the dynamic panel 110 can present a semi-transparent (or an otherwise a semi-reflective) surface to the user. The semi-transparent surface can be partially reflective of incident light, such as about 10% to about 90% of incident light can be reflected from the dynamic panel 120 to the user. In an example the dynamic panel 110 in semi-transparent state can serve as a protective screen and function to adjust the brightness of the display panel 120, such as to enhance viewing of the display panel 120 in conditions of low ambient light.

The VRDS 100 can include a display panel 120, such as to present a visual representation of data to a user on a display device including a video monitor. Referring to FIG. 2, the display panel 120 can include a third surface 122, such as a third surface 122 that can face the second surface 114 of the dynamic panel 110, and a fourth surface 124, such as a fourth surface 124 that can be generally parallel to the third surface 122. The display panel 120 can include a display element 126, such as a monitor or screen, and a protective layer 128.

The display panel 120 can be configured to display a representation of data from a computer, such as a computer in electrical communication with the display element 126. The display panel 120 can be configured to display a representation of data from a remote device, such as at least one of a tablet computer or a smart phone in electrical communication with the display element 126 or the system circuitry 140. In an example, data can be "cast" from a remote device, such as a smart phone, to apparatus 100, such as for presentation to a user on the display element 126.

The sensor 130 can sense the presence of the user, such as a user in proximity to the VRDS 100. The sensor 130 can provide an interface, such as an interface for the user to enable the VRDS 100, such as in preparation to interact with the VRDS 100. Interaction with the VRDS 100 can include user control of the VRDS 100, such as selection of an of an operational mode (e.g., reflective, translucent, or transparent state), acknowledgement of a notification, responding to a message, or to energize the VRDS 100 (e.g., turn the VRDS 100 on/off).

Activation of the VRDS

The sensor 130 can include a touch sensor, such as a sensor that can sense physical contact of the user with the sensor 130. The touch sensor can include a selection-type sensor, such as to receive input from the use of the VRDS 100. A selection-type sensor can include a sensor configured to receive an indication of alpha-numeric input, such as user action required to respond to an email message. A selection sensor can include at least one of an ASCII-type keyboard or alpha-numeric keypad sensor. A selection-type sensor can include a sensor configured to receive an indication of binary input such as a user action required to clear a task notification including a "mouse click" user action. In an example, the VRDS 100 can be turned on, such as changed from an inactive state to an active state, or off, such as changed from an active state to an inactive state, by providing a binary input, such as one of more binary inputs including three binary inputs (e.g., three mouse clicks) A selection sensor can include a smart device, such as a smart device in communication with the VRDS 100 running a software application configured to adjust a function of the VRDS 100.

The touch sensor can include a wearable sensor, such as a sensor 130 that can be attached to a user to receive input from the user, such as to affect a change in the VRDS 100. A wearable sensor can include at least one of body contact sensor, such as a sensor 130 that can be grasped in the hand of a user or attached to another part of the user, or an ocular sensor, such as a tracking sensor to sense eye motion or gaze direction of the user. The touch sensor can include a pressure sensor, such as a pressure sensor that can be in communication with the VRDS 100. The pressure sensor can be located on the first surface 112 of the dynamic panel 110. The pressure sensor that can be remote from the VRDS 100 and can include a pressure sensitive floor covering, such as a pressure sensitive mat that can be located in proximity to the VRDS 100.

The touch sensor can include a smart device, such as at least one of a mobile phone or a tablet device, in communication with the VRDS 100 and running an application, such as an enable app, configured to enable the smart mirror, such as to adjust the dynamic panel 110 from a first operational mode to a second operational mode. In an example, the user can activate the enable app in wireless communication with the control circuitry 140, to activate the control circuitry 140, such as to initiate a voltage source to adjust voltage level applied to the dynamic panel 110 to adjust the operational mode of the dynamic panel 110.

The sensor 130 can include a touchless sensor, such as a sensor that can receive user input in the absence of physical contact with the sensor. The touchless sensor system can include a sound-based sensor and processing system, such as to receive a sound command from a user. A sound-based sensor can include a sensor configured to receive sound commands in a range of sonic frequencies including frequencies in a range of about 10 Hz to about 25 kHz.

The touchless sensor system can include an electromagnetic (or EM)-based sensor and processing system, such as to receive a command from an ID device emitting an ID signal, such as an ID signal encoded in the sonic or EM spectrum. The ID device can include a smart device, such as an application (e.g., an app) running on a smart device, configured to generate the ID signal or a standalone ID device. An ID signal can include a single frequency signal or a multi-frequency signal. A multi-frequency ID signal can include a user-defined signature, such as a periodic signal that can vary in at least one of frequency or amplitude, configured by the user to uniquely identify the user to the VRDS 100.

An EM-based sensor can include a sensor configured to receive an ID signal over a range of frequencies, such as sonic frequencies, radio frequencies including frequencies in a range of about 25 kHz to about 300 MHz, microwave frequencies including frequencies in a range of about 300 MHz to about 300 GHz, and infrared frequencies including frequencies in a range of about 300 GHz to about 430 THz. The touchless sensor can include a gesture system, such as an infrared-based sensor and processing system to receive gesture input from a user.

The sensor 130 can include a user distance sensor, such as a sensor 130 that can detect the presence of a user within a radius of the VRDS 100. A user distance sensor can include an ultrasonic sensor, such as an ultrasonic transceiver configured to emit a signal and receive the reflected signal. In an example, a user approaching the VRDS 100 can reflect the ultrasonic signal emitted by the ultrasonic transceiver back to the ultrasonic transceiver, such as to indicate the presence of the user. A user distance sensor can include a capacitive sensor, such as a capacitive sensor configured to sense a change in a capacitive circuit. In an example, a user can interact with the capacitive sensor, such as by passing a hand over, but not touching, the capacitive sensor such as to induce a change in the capacitive circuit to indicate the presence of the user.

A user distance sensor can include a motion sensor including at least one of an active motion sensor or a passive motion sensor. An active motion sensor can include a sensor that can emit a signal including an EM field and detect a disturbance in the emitted signal, such as by receiving a reflected signal or detecting a disturbance in the EM field to indicate the presence of a user to interact with the VRDS 100. In an example, an active motion sensor can include at least one of an infrared-based motion sensor, a capacitance-based motion sensor an inductive-based motion sensor, or a reluctance-based motion sensor. A passive motion sensor can include a sensor that can sense an environmental variable proximity to the sensor and detect a disturbance in the environmental variable to indicate the presence of a user to interact with the VRDS 100. In an example, a passive motion sensor can include a passive infrared (PIR) sensor.

Verified Access to the VRDS

The VRDS 100 can be used to receive, display, and send information, such as confidential information intended for the sole use and knowledge of the user interacting with the VRDS 100. To protect confidential information, the VRDS 100 can include a security feature, such as a security feature integrated into a component of the VRDS 100 to safeguard confidential user information.

The sensor 130 can include user identification (UI) circuitry, such as to restrict access of the VRDS 100 to a verified user of the VRDS 100. A verified user can include a user that has been granted access to the VRDS 100, such as defined by inclusion of verified user information into an access database that can be referenced by the UI circuitry. The UI circuitry can receive data such as data sensed by the sensor 130, process data, such as to compare data received from the sensor 130 with verified data in the access database to identify a verified user, and enable access to the VRDS 100, such as to allow access of the verified user to the VRDS 100. The UI circuitry can compare the received data, such as from the sensor 130, with previously collected data from a database, such as a database of data collected from authorized users of the VRDS 100. The UI circuitry can maintain a log of user information, such as in a login database including username time/date of access, and other information pertinent to monitor VRDS 100 access, to document use of the VRDS 100. In the event an unauthorized user attempts to access the VRDS 100, the UI circuity can issue an alert, such as an email or text message, to an authorized user, such as to inform the authorized user of a potential security breach.

The sensor 130 can include a biometric sensor, such as a sensor to identify a biometric characteristic of a user for verification by the VRDS 100. A biometric characteristic can include a physical characteristic of the user, such as a fingerprint of the user, a texture or shape of the user face, and the voice of the user. The UI circuitry can receive biometric data, such as from a biometric sensor, and process the biometric data, such as to identify a biometric characteristic, and compare the biometric characteristic to a verified biometric characteristic, such as a biometric characteristic of a verified user in the access database.

The biometric sensor can include an imaging sensor, such as a sensor to capture an image of an unverified user for authorization by the VRDS 100. The imaging sensor can include UI circuitry, such as UI circuitry to process the captured image of the unverified user including identification of a facial feature from the captured image and comparison of the facial feature with a facial feature profile of a verified user.

The biometric sensor can include an acoustic sensor, such as an acoustic sensor to capture an acoustic signature of an unverified user for authorization by the VRDS 100. The acoustic sensor can include UI circuitry, such as UI circuitry to process the received acoustic signature of the unverified use including identification of frequency or inflection information and comparison of the acoustic signature with the acoustic signature profile of a verified user.

The sensor 130 can include a device sensor, such as a sensor to identify a characteristic of a smart device associated with a verified user for authorization by the VRDS 100. A characteristic of a smart device, such as the characteristic of a specific smart device known to be associated with a verified user, can include at least one of a traceability code or other unique identifier associated with a chip set or other component of the smart device. A unique identifier can include at least one of an IMEI (International Mobile Equipment Identity) code, a MEID (Mobile Equipment IDentifier) code, an ESN (Electronic Serial Number) code, or a IMSI (International Mobile Subscriber Identity) code. In an example, the device sensor can initiate communication with the smart device, such as pair with the smart device via a Bluetooth connection, poll the smart device, such as interrogate the smart device, for a unique identifier, and compare the unique identifier polled with the access database to identify the verified user. In an example, a characteristic of a specific smart device can be accessed with software running on at least one of the smart device or the UI circuitry, such as CPUID software.

The UI circuitry can process data, such as a keyword or a security code, to verify a user of the VRDS 100. In an example, the UI circuitry can process a keyword or security code generated by a separate security system, such as from a third-party software security system vendor. In an example, the user can initiate a third-party app on a smart device, such as a mobile phone, that can request a security code from the third-party vendor. In an example, a user can be verified with a security software running on the UI circuitry, such as a mobile access control platform and associated key system from a security software vendor including BlueID, GMBH (Munich Germany). In an example, the VRDA 100 can assume a role in a local network, such as a local or global internet of things (IOT) and utilize one or more security features afforded as a member of the IOT network.

The VRDS 100 can include system circuitry 140, such as to facilitate operation of the VRDS 100. The system circuitry 140 can be in communication with at least one of the dynamic panel 110, the display panel 120 or the sensor 130. The system circuitry 140 can include a communications module, such as a network interface device 420, to communicate with, such as receive from or transmit to, a peripheral device including a smart device. The system circuitry 140 can include a voltage source, such as the voltage source in communication with the dynamic panel 110, to adjust an operational mode, such as changing from a first operational mode to a second operational mode. The system circuitry 140 can include the UI circuitry as described elsewhere in this application. The system circuitry 140 can include a processing unit, such as a programmable central processing unit (CPU). The CPU can execute instructions to implement methods of using the VRDS 100, such as described in this application. In an example, the CPU can be a component of a computing machine, such as a computing machine 400. The system circuitry 140 can include a computing machine 400, such as the computing machine 400 described in FIG. 4.

Figure 3:
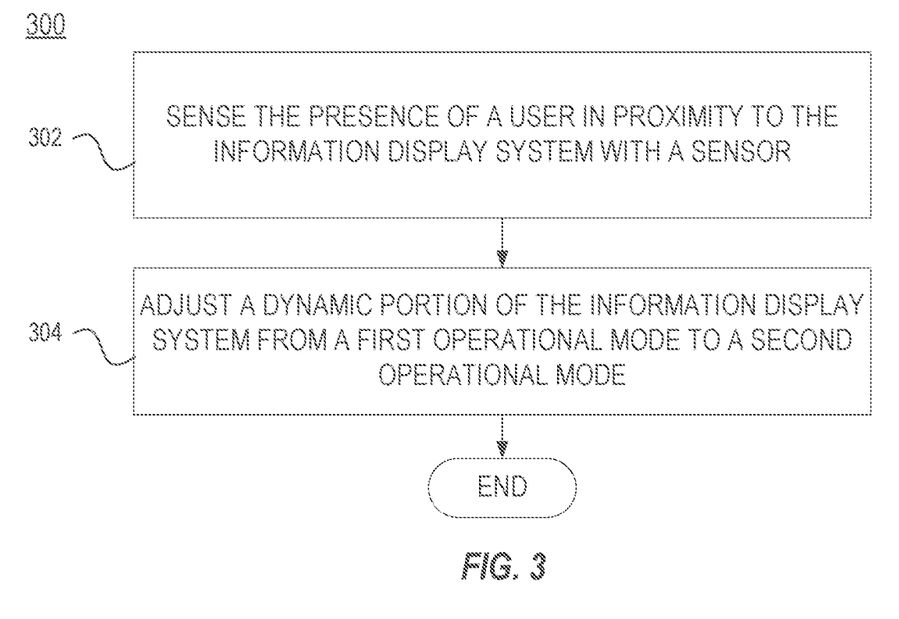
FIG. 3 shows an example method of using the example display system.

FIG. 3 shows an example method of using the VRDS 100, such as to adjust the visibility of an information display system. At 302, the VRDS 100 can sense a presence of a user, such as a user proximity to the VRDS 100. Sensing the presence of the user can include sensing the presence of the user with a sensor 130, such as in communication with the VRDS 100.

Sensing the presence of a user with the sensor 130 can include sensing user presence through user interaction with a touch sensor. In an example, user interaction with a touch sensor can include at least one of user interaction with a pressure sensor, such as a pressure sensor located on the first surface 112 of the dynamic panel 110 and a pressure sensitive mat located in proximity to the VRDS 100, or a selection sensor, such as a smart device in communication with the VRDS 100 running a software application configured to adjust a function of the VRDS 100.

Sensing the presence of a user with the sensor 130 can include sensing user presence through user interaction with a touchless sensor. In an example, user interaction with a touchless sensor can include at least one of user interaction with a sound-based sensor, an EM-based sensor, or a proximity sensor, such as at least one of an active motion sensor or a passive motion sensor.

Sensing the presence of a user with the sensor 130 can include sensing the presence of a verified user, such as with a sensor 130 and UI circuitry. In an example, authorizing the presence of a verified user can include receiving data, such as data sensed from a sensor 130, processing data, such as the data received from the sensor 130, and enabling access to the VRDS 100, such as by authorizing a verified user to use the VRDS 100. In an example, sensing the presence of a verified user can include sensing the presence of a verified user with at least one of a biometric sensor or a device sensor.

Sensing the presence of a user, such as a verified user, can include processing data, such as using UI circuitry to process a keyword or a security code generated by a separate security system, such as a third-party software security system running on the circuitry.

At 304, the VRDS 100 an adjust a component of the VRDS 100, such as in response to sensing the presence of a user including a verified user. Adjusting a component of the VRDS 100 can include adjusting the dynamic panel 110 from an initial (or first) operational mode to a changed (or second) operational mode. Adjusting from an initial operational mode to a changed operational mode can include adjusting the percentage reflectivity of the dynamic panel 110 from an initial operational mode with a first reflectivity to a changed operational mode with a second reflectivity.

In an example, adjusting from an initial operational state to a changed operational state can include at least one of adjusting from a reflective state to a transparent state, such as to allow the user to visualize least a part of the display panel 120, or from a transparent state to a reflective state, such as to obscure visualization of at least a part of the display panel 120.

In an example, adjusting from an initial operational state to a changed operational state can include at least one of adjusting from a reflective state to a translucent state, such as to improve user visibility of at least a part of the display panel 120 under various lighting or use conditions, or from a transparent state reflective state, such as to obscure visualization of at least a part of the display panel 120.

Figure 4:
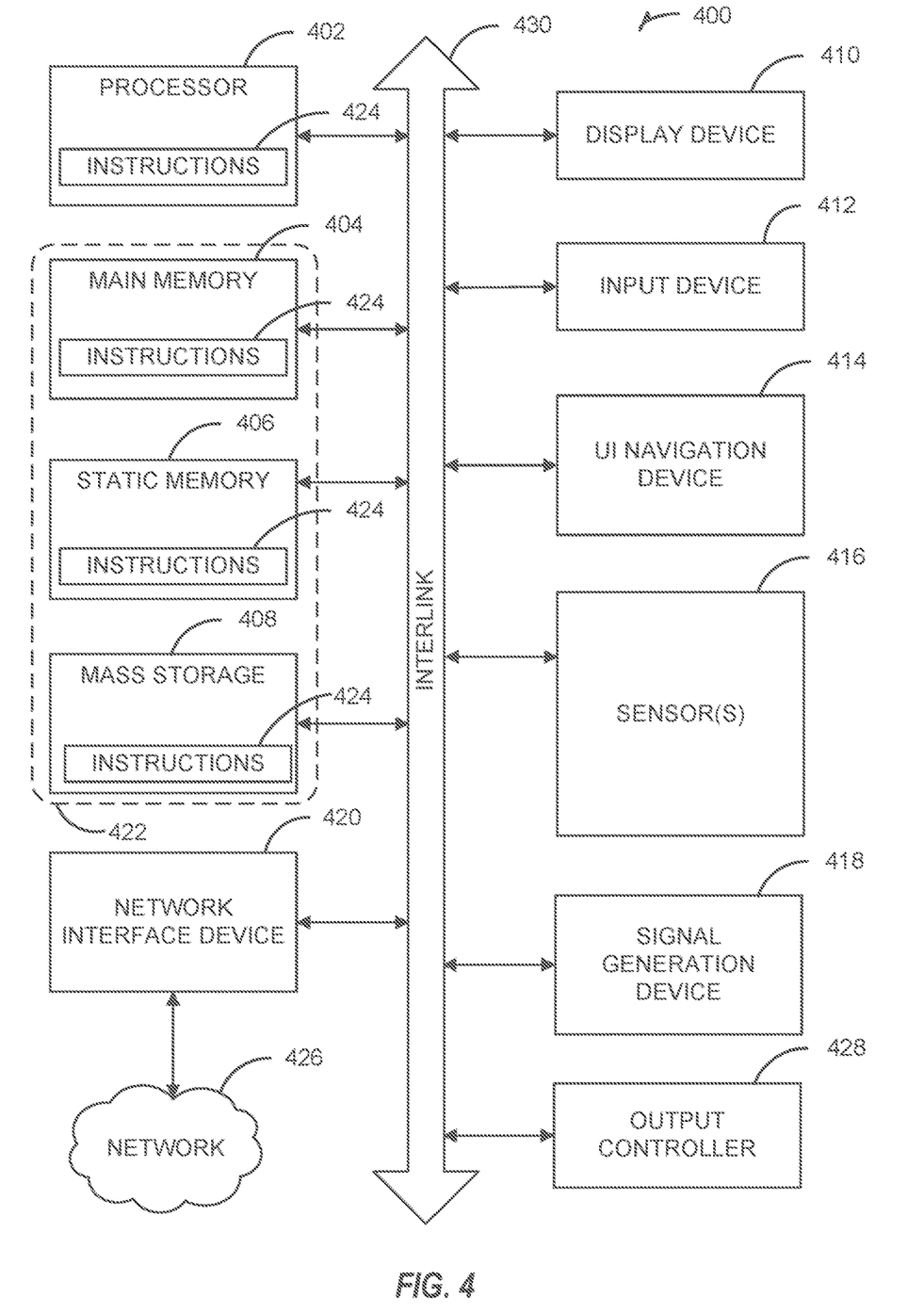
FIG. 4 shows a block diagram of an example computing machine.

FIG. 4 shows a block diagram of an example computing machine 400, such as can be used as (or in conjunction with) system circuitry 140. Methods can be implemented the system circuitry 140. The system circuitry 140 can include a computing machine 400 upon which any one or more of the techniques or methods discussed herein can be performed. The machine 400 may be a local or remote computer, or processing node in an on-the-go (OTG) device such as a smartphone, tablet, or wearable device. The machine 400 may operate as a standalone device or may be connected (e.g., networked) to other machines. In an example, the machine may be directly coupled or be integrated with the apparatus 100, such as any components of the apparatus 100. It will be understood that when the processor 402 is coupled directly to the apparatus 100, that some components of machine 400 can be omitted to provide a lightweight and flexible device (e.g., display device, UI navigation device, etc.). In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. In an example, the machine 400 can include a purpose-designed circuit, such as a printed circuit board that can execute the functions and methods disclosed throughout this application. Further, while only a single machine is illustrated, the term "machine" can also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate by, logic or a number of components, or mechanisms. Circuitry can include a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 400 can include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 406. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. In an example, sensors 421, such as including sensors 130, can include wearable, assistive device-based and environmental sensors, as described above. The machine 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 405, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 400, and includes digital or analog communications signals or other intangible medium to facilitate communication of such software.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A" or "B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transistors, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. An information display system comprising:
a dynamic panel, including a first surface configured to face a user and a second surface generally parallel to the first surface, the dynamic panel configured to present a variably reflective surface defined by an initial operational state to the user;
a display panel, including a third surface that faces the second surface and a fourth surface generally parallel to the third surface, the display panel configured to display information to the user; and
an activation sensor, in communication with the dynamic panel, configured to sense a presence of the user and adjust the dynamic panel to change the initial operational state,
wherein the activation sensor includes user identification (UI) circuitry configured to restrict access to the information display system to a verified user, and wherein the activation sensor includes a device sensor configured to sense a characteristic of a smart device and the UI circuitry configured to identify an authorized user based on the presence of the smart device associated with the verified user.

2. The system of claim 1, wherein at least one of the initial operational state or the changed operational state includes at least one of a transparent state, a translucent state, or a reflective state.

3. The system of claim 1, wherein the dynamic panel includes the dynamic panel with an electrically adjustable layer including at least one of a suspended particle component layer, an electrochromic component layer, or a polymer-dispersed liquid-crystal (PDLC) component layer.

4. The system of claim 3, wherein the electrically adjustable layer includes the electrochromic component layer.

5. The system of claim 3, wherein the electrically adjustable layer includes the PDLC component layer.

6. The system of claim 1, wherein the activation sensor includes a touch sensor.

7. The system of claim 6, wherein the touch sensor includes a smart device, in communication with the information display system, running an application configured to sense the presence of the user through user interaction with the application.

8. The system of claim 6, wherein the touch sensor includes a wearable sensor.

9. The system of claim 1, wherein the activation sensor includes a touchless sensor.

10. The system of claim 9, wherein the touchless sensor includes a capacitive sensor.

11. The system of claim 9, wherein the touchless sensor includes an electromagnetic-based sensor.

12. The system of claim 1, wherein the UI circuitry configured to restrict access based on an indication of biometric identification associated with the verified user.

13. The system of claim 12, wherein the activation sensor includes an imaging device to sense an indication of biometric information and the UI circuitry includes a facial recognition circuit configured to receive the indication of biometric information from the imaging device and process the received indication to identify the verified user.

14. A method of using an information display system, the information display system comprising a dynamic panel including a first surface configured to face a user and a second surface generally parallel to the first surface, the dynamic panel configured to present a variably reflective surface defiance by an initial operational state to the user, a display panel, including a third surface that faces the second surface and a fourth surface generally parallel to the third surface, the display panel configured to display information to the user, and an activation sensor, in communication with the dynamic panel, configured to sense a presence of the user and adjust the dynamic panel to change the initial operational state, wherein the activation sensor includes user identification (UI) circuitry configured to restrict access to the information display system to a verified user, and wherein the activation sensor includes a device sensor configured to sense a characteristic of a smart device and the UI circuitry configured to identify an authorized user based on the presence of the smart device associated with the verified user, the method comprising:

sensing the presence of the user in proximity to the information display system with the activation sensor; and adjusting the dynamic panel of the information system from the initial operational state to the changed operational state.

15. The method of claim 14, wherein the activation sensor includes a touchpad device, and wherein sensing the presence of the user includes sensing the presence of the user through user interaction with the touchpad device.

16. The method of claim 14, wherein the activation sensor includes a biometric sensor, and wherein sensing the presence of the user includes sensing the presence of the user with the biometric sensor.

17. The method of claim 16, wherein the biometric sensor includes an imaging device and wherein sensing the presence of the user includes sensing the presence of the user with the imaging device.

18. The method of claim 14, wherein sensing the presence of the user includes sensing the presence of the authorized user with at least one of the activation sensor or the UI circuitry.

19. The method of claim 14, wherein adjusting the dynamic panel from the initial operational state to the changed operational state includes adjusting the dynamic panel from a reflective state to a translucent state.

20. The method of claim 14, wherein adjusting the dynamic panel from the initial operational state to the changed operational state includes adjusting the dynamic panel from a reflective state to a transparent state.

* * * * *